(12) United States Patent
Merker et al.

(10) Patent No.: US 11,487,737 B2
(45) Date of Patent: Nov. 1, 2022

(54) TAKE OVER TABLE OPENING FOR OPERATORS

(71) Applicant: SAP SE, Walldorf (DE)

(72) Inventors: Till Merker, Sandhausen (DE); Christina Teflioudi, Heidelberg (DE); Paul Willems, Heidelberg (DE)

(73) Assignee: SAP SE, Walldorf (DE)

( * ) Notice: Subject to any disclaimer, the term of this patent is extended or adjusted under 35 U.S.C. 154(b) by 294 days.

(21) Appl. No.: 16/364,521

(22) Filed: Mar. 26, 2019

(65) Prior Publication Data
US 2020/0311044 A1    Oct. 1, 2020

(51) Int. Cl.
*G06F 16/23* (2019.01)
*G06F 16/22* (2019.01)
*G06F 16/28* (2019.01)

(52) U.S. Cl.
CPC ...... *G06F 16/2343* (2019.01); *G06F 16/2282* (2019.01); *G06F 16/289* (2019.01)

(58) Field of Classification Search
CPC . G06F 16/2343; G06F 16/289; G06F 16/2282
See application file for complete search history.

(56) References Cited

U.S. PATENT DOCUMENTS

| | | | |
|---|---|---|---|
| 2001/0013030 A1* | 8/2001 | Colby | G06F 16/22 707/999.001 |
| 2004/0133538 A1* | 7/2004 | Amiri | G06F 16/24552 707/999.001 |
| 2005/0050039 A1* | 3/2005 | Theobald | G06F 16/24524 707/999.004 |
| 2005/0234989 A1* | 10/2005 | Bailey | G06F 16/2343 707/999.107 |
| 2007/0299814 A1* | 12/2007 | Barsness | G06F 16/2453 707/999.003 |
| 2008/0235186 A1* | 9/2008 | Laurila | G06F 16/903 707/999.003 |
| 2009/0047937 A1* | 2/2009 | Zellner | H04W 4/029 455/414.1 |
| 2010/0132024 A1* | 5/2010 | Ben-Natan | G06F 9/545 707/741 |
| 2012/0323873 A1* | 12/2012 | Mistry | G06F 16/2336 707/704 |
| 2016/0110422 A1* | 4/2016 | Roytman | G06N 5/00 706/12 |
| 2017/0316045 A1* | 11/2017 | Deb | G06F 16/2228 |
| 2018/0241690 A1* | 8/2018 | Spatzier | G06F 9/45558 |

* cited by examiner

*Primary Examiner* — Ashish Thomas
*Assistant Examiner* — Jedidiah P Ferrer
(74) *Attorney, Agent, or Firm* — Mintz, Levin, Cohn, Ferris, Glovsky and Popeo, P.C.

(57) ABSTRACT

In some aspects, there is provided a method that may include: intercepting a query requiring access to data stored in a table. The query may include an identifier, which may be associated with a row of the table and a reference to a column of the table. The method may further include preparing a table object to enable access to the data stored in the row and the column of the table. The preparing may include locating the row associated with the identifier. The preparing may further include acquiring locks for the data stored in the located row and the column in the row. The method may also include executing the query upon preparing the table object. Related systems, methods, and articles of manufacture are also described.

20 Claims, 5 Drawing Sheets

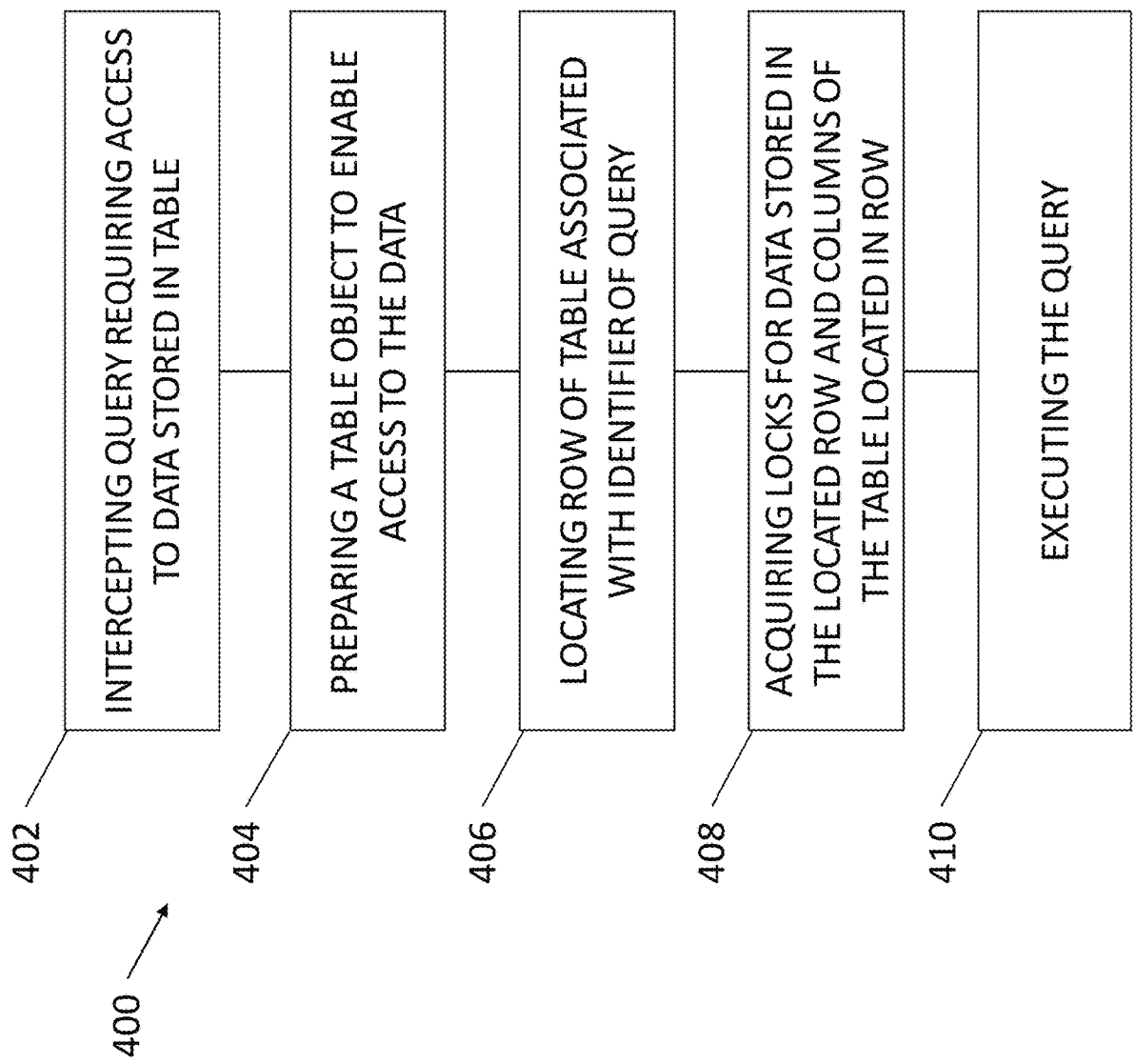

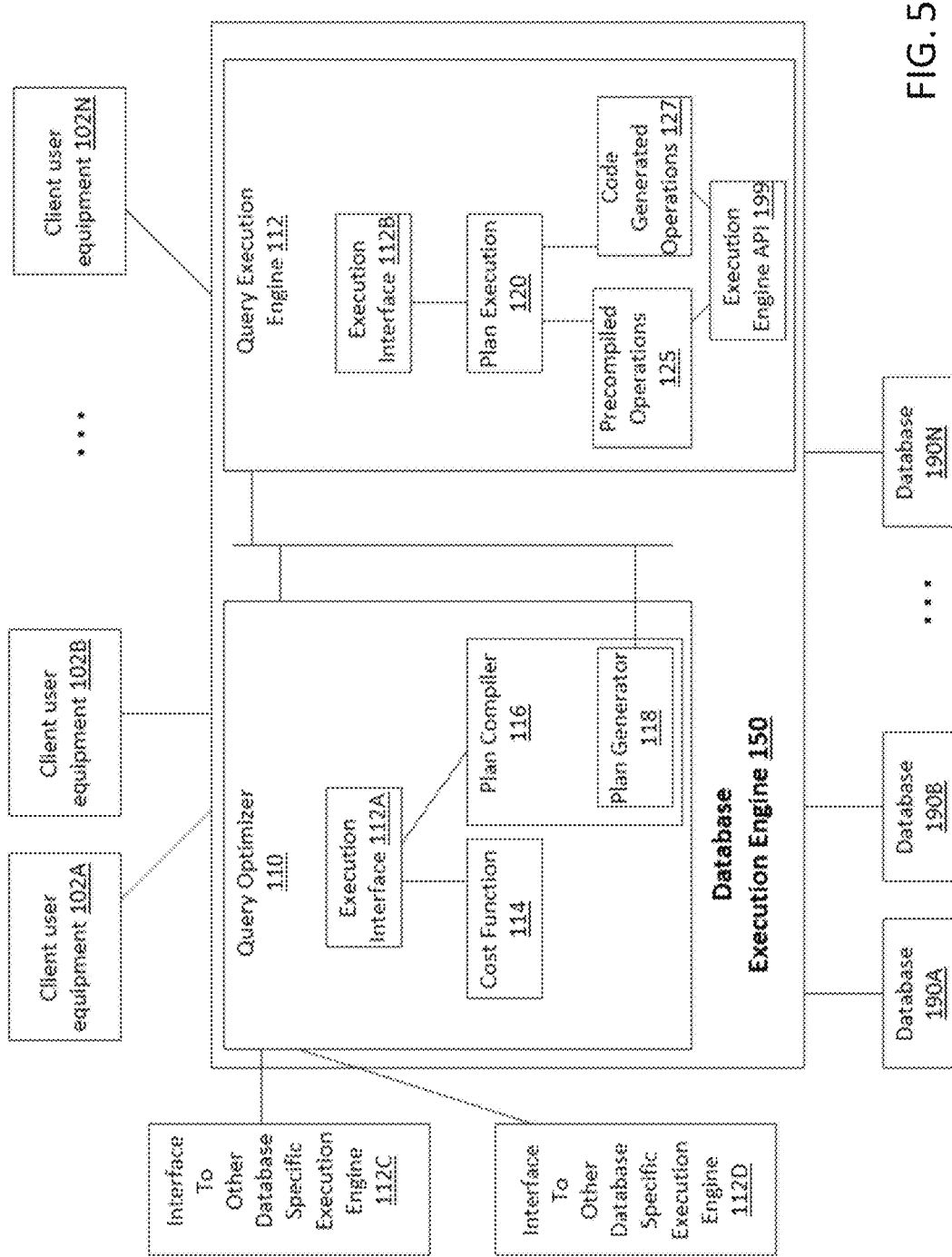

TAKE OVER TABLE OPENING FOR OPERATORS

TECHNICAL FIELD

The subject matter described herein relates to database management, and more particularly, query execution planning.

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. Given the complexity of these queries and/or their volume, the underlying databases face challenges in order to optimize performance.

SUMMARY

In one aspect, a method, computer program product and system are provided for query execution planning.

In some aspects, there is provided a method including: intercepting, by a query handler separate from an execution engine configured to execute a query requiring access to data stored in a table. The query may include an identifier, which may be associated with a row of the table and a reference to a column of the table. The method may further include preparing, by the query handler, a table object to enable access to the data stored in the row and the column of the table. The preparing may include locating, by the query handler, the row associated with the identifier. The preparing may further include acquiring locks, by the query handler, for the data stored in the located row and the column in the row. The method may also include executing, by the query handler, the query upon preparing the table object.

In some variations, the operations can further include one or more features disclosed herein including the following. For example, only the data stored in the located row and the column in the row may be locked by the query handler. In some variations, the row associated with the identifier is located in a first fragment of the table. The preparing may further include acquiring locks, by the query handler, for all of the data stored in the first fragment of the table.

In some examples, the locating includes reading, by the query handler, a plurality of rows of a first fragment of the table. The locating may also include acquiring locks, by the query handler, for the plurality of rows of the first fragment while reading the plurality of rows of the first fragment. The locating may further include determining, by the query handler, that the plurality of rows does not include the row associated with the identifier. The locating may further include releasing, by the query handler, the plurality of rows of the first fragment.

In some examples, the locating may also include reading, by the query handler, a plurality of rows of a second fragment of the table. The locating may also include acquiring locks, by the query handler, for the plurality of rows of the second fragment while reading the plurality of rows of the second fragment. The locating may further include locating, by the query handler, the row associated with the identifier in the second fragment. The locating may also include releasing, by the query handler, the locked plurality of rows of the second fragment that does not include the row associated with the identifier.

In other examples, the preparing may further include reading, by the query handler, a plurality of rows of the table. The preparing may also include acquiring locks, by the query handler, for the plurality of rows of the table while reading the plurality of rows of the table. The preparing may also include releasing, by the query handler, the locked plurality of rows of the table that does not include the row associated with the identifier.

In some examples, the row associated with the identifier includes a plurality of rows of the table. In other examples, acquiring locks further comprises acquiring locks for a subset of fragments of the table. The located row may be located within the subset of fragments.

Implementations of the current subject matter can include systems and methods consistent with the present description, including one or more features as described, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4 depicts an example of a process for taking over table opening by an operator, in accordance with some example embodiments; and FIG. 5 depicts another block diagram for a system, in accordance with some example embodiments;

When practical, similar reference numbers denote similar structures, features, or elements.

DETAILED DESCRIPTION

Figure 1:
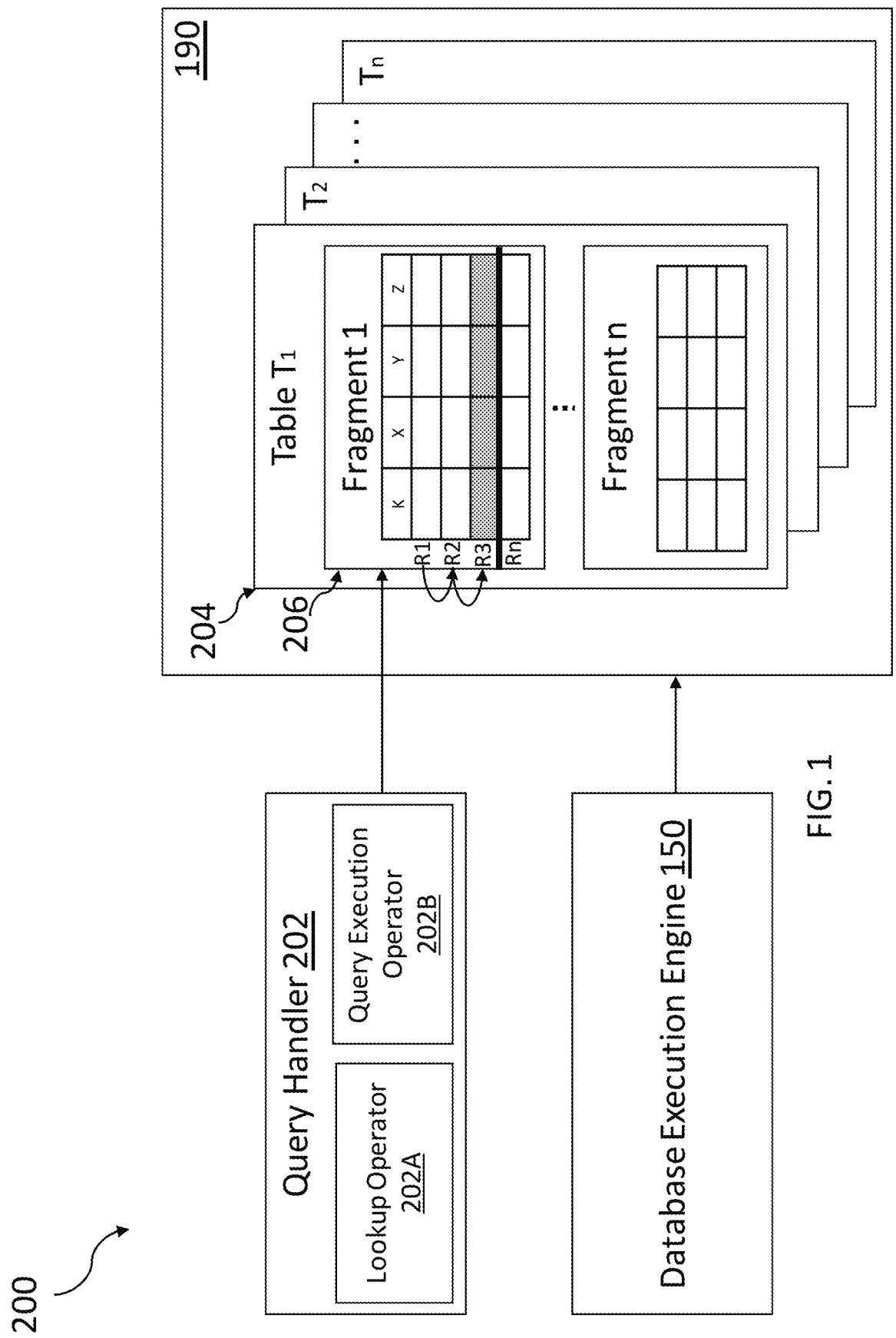
FIG. 1 is a block diagram for a system, in accordance with some example embodiments.

Database management systems and operations performed on the data managed by a database management system have become increasingly complex. For example, a database management system (or database for short) can support relatively complex online analytical processing (OLAP, which can perform multi-dimensional analysis) to more straightforward transaction based online transaction processing (OLTP). Moreover, the database may be configured as a row-store database or column-store database, each of which may have certain aspects with respect to queries and other operations at the database. For example, the database may encode data using dictionaries, while some databases may not. In addition to these various databases layer differences, the queries performed at a database can comprise a complex sequence of operations in order to generate corresponding responses. To implement the complex sequence, a query execution plan (or query plan for short) may be implemented. The query plan represents a sequence of operations, such as instructions, commands, and/or the like, to access data in the database. The database may also include a query plan optimizer to determine an efficient way to execute the query plan.

From an application or client perspective, it can be extremely cumbersome to access databases. For example, an application may need to query different types of databases using complex queries. As a consequence, the application layer in this example would need to be configured to handle the various types of databases and the various query types. Additionally or alternatively, each database may need to process queries from the application into a format and structure that can be handled by the given database. Pushing complex operations and support for a variety of different database types to the application layer may contravene the need to have relatively lighter weight and/or readily deployable applications. On the other hand, pushing complex operations to the database layer where data is stored may draw processing and/or memory resources at the database and may thus reduce the performance and response times for queries on that database layer.

In some example embodiments, there may be provided an execution engine that may decouple the higher-level, application layer from the database layer (e.g., the persistence or storage layer where data including database tables may be stored and/or queried using instructions, such as commands and/or the like). The execution engine may be implemented separately from the database layer and/or the application layer. Furthermore, the execution engine may be configured to receive a query, generate a query plan (including for example query algebra), optimize the query plan, and/or generate executable code, which can be executed at runtime. The executable code may include pre-compiled code (which can be selected for certain operations in the query plan) and/or code that is generated just-in-time specifically for execution of the query plan.

The execution engine may be configured to perform some operations itself, while the execution engine may send some operations (e.g., relatively basic commands, such as reads, writes, scans, and/or the like) to the database layer. Furthermore, the execution engine may receive corresponding responses from the database layer where data is stored/persisted and certain commands, such as reads, writes, scans, and/or the like, can be performed. The execution engine may perform more complex execution operations, such as rule-based operations including relatively more complex operations such as joins, projections, and/or the like, while accessing the database's storage/persistence layer when needed to read, write, update, and/or perform other operations.

The execution engine may be configured to support a wide range of database types to reduce, if not eliminate, the need for specialized execution engines for each type of database. For example, rather than having an execution engine for each type of database (e.g., an execution engine for an OLAP database, another execution engine for an OLTP database, an execution engine for a row-store database, an execution engine for a column-store database, and/or the like), the execution engine disclosed herein can perform query execution for a variety of database types and send queries to the different types of database layers (and/or their storage/persistence layer) and handle the corresponding responses.

As noted above, executing the query plan may include a sequence of operations, such as instructions, commands, and/or the like, that require access to data stored in one or more data tables, or one or more portions (e.g., partitions, fragments, etc.) of the data tables. It can be extremely cumbersome to access the data tables—it may take a large amount of time to access the data stored in the data tables while the sequence of operations is being performed and may require a large amount of computational resources to perform the sequence of operations.

Generally, to access the data stored in the one or more data tables, before or during the sequence of operations, an operator (e.g., a relational database operator such as select, etc.) may open each of the data tables (or portions of the data tables) in which all of the rows and columns referenced in the query are stored. In this context and as described herein, opening each of the data tables (or portions of the data tables) may include acquiring locks for at least some of the data stored in the data tables (and fragments of each of the tables), such as the data that is being read and data that has been read.

Opening each of the data tables may also include accessing at least a portion of all of the rows and columns referenced in the query (e.g., incrementing a reference count for each row and/or column). In some instances, acquiring locks for all of the data tables (and all of the fragments of each of the data tables) may restrict or prevent another query from accessing the data tables while the original query is being executed. Additionally, in some instances, acquiring locks for all of the data tables may, during the sequence of operations, require the operator to read all of the data stored in all of the data tables that have been opened. During execution of a large sequence of operations that requires access to a large amount of data, it may be beneficial to open a large number of data tables before executing the query plan so that the large amount of data is readily available to access during execution of the query plan.

In contrast, for smaller sequences of operations or operations that require access to a smaller amount of data stored in the data tables, such as operations that only require access to data stored in a limited number of rows and/or columns, the amount of time it takes to access or read all of the data stored in the opened data tables while the sequence of operations is being performed and the amount of computational resources required to perform the sequence of operations may be too large, and thus unnecessarily slow down the execution of the query. For example, certain queries (or sequences of operations), such as primary key lookup queries, top limit queries, join queries, and the like that may result in only a single or limited number of rows being accessed (e.g., 1, 2, 3, 4, 5, 10, 15, 20, 30, 50 or less rows), may be expected to take less than a millisecond to complete.

However, by requiring the operator to read entire data tables in which the rows and/or columns referenced in the query are stored during query execution, the queries may be penalized with unnecessary overhead, as many of the opened fragments, columns, and/or rows of the data tables may not be necessary to execute the query. Accordingly, in some implementations, such as when a limited number of rows and/or columns are referenced in a query, a query handler as described herein may intercept the query and execute the table opening process before or during query plan execution, to open only a subset (e.g., the limited number) of fragments, columns, and/or rows of the data tables. In addition, in some implementations, the query handler may not open any remaining fragments, columns, and/or rows once the query handler locates and/or opens all of the referenced fragments, columns, and/or rows of the data tables. Thus, the query handler may optimize performance of the database management system by, for example, minimizing the time and computational resources required to perform the one or more sequences of operations.

FIG. 1 a block diagram for a database management system 100, in accordance with some example embodiments. The database management system 100 may include an execution engine 150 that may be configured to receive a query, generate a query plan (including for example query algebra), optimize the query plan, and/or generate executable code, as discussed herein, and discussed in more detail with respect to FIG. 5. The database management system 100 may also include a query handler 202 that performs one more operations of a query, such as before or during execution of a query execution plan. The query handler 202 (which may comprise pre-compiled code and/or generated executable code) may define an application separate from the execution engine 150 that intercepts a query and performs one or more query operations. The query handler 202 may include one or more operators, such as a lookup operator 202A and a query execution operator 202B that perform one or more of the query operations. The query handler 202 may interact with one or more data tables 204 stored on a database 190. For example, when a query plan is executed, code for the query plan may include one or more query handlers.

Generally, when the query requires access to data stored in a data table such as the one or more data tables 204 (e.g., Table $T_1$, Table $T_2$ . . . Table $T_n$), one or more of the query handlers, such as the query handler 202, may prepare and open a table object in order to access the data stored in the one or more data tables 104 (which when opened returns a prepared Table $T_1$, Table $T_2$ . . . Table $T_n$). The data object may represent one or more data tables, or portions of data tables, such as one or more fragments (e.g., partitions), rows, and/or columns of each of the one or more data tables, and can be stored in cache with other code, objects, and/or the like awaiting runtime execution of the query. When the query handler 202 requires access to the data stored in one or more of the data tables 204, the corresponding table object may be opened in order to access the data. In some example embodiments, the table object can be opened before or during query plan execution, to provide access to one or more data tables, or portions of data tables.

In some implementations, however, before the query plan is executed by the database management system 100, the query handler 202 may intercept the query and take over data table opening. For example, the query handler 202 may selectively open (e.g., lock) a subset of the one or more data tables 204, or portions of the data tables 204, such as one or more fragments 206, rows, and/or columns, before the query plan is executed, to reduce the time and computational resources required to perform the one or more sequences of operations of the query.

Since an entire fragment of the one or more fragments 206 would be opened by the query handler 202 in order for the query handler 202 to read from a column located in the fragment 206, it may be beneficial for the query handler 202 to open only a subset of fragments of the one or more fragments 206. In other words, the query handler 202 may open only the fragment 206 in which the row and/or column referenced in the query is located. Thus, the query handler 202 may not open (or may release) any fragments that do not include the row and/or column referenced in the query. In some instances, the query handler 202 may not even attempt to access the remaining fragments of the one or more fragments 206 once the row and/or column referenced in the query is located by the query handler 202. For example, the query handler 202 may not continue reading additional fragments of the one or more fragments 206 once the query handler 202 locates the row and/or column referenced in the query.

Referring back to FIG. 1, each of the one or more data tables 204 may include one or more fragments or partitions 206 (e.g., Fragment 1 . . . Fragment n). Each of the one or more fragments 206 may include a plurality of columns including, for example, column K, column X, column Y, column Z and/or the like. At least one of the plurality of columns in Fragment 1 of Table $T_1$ may be designated as a key (e.g., column K), such as a primary key, a unique key, or another identifier, that is associated with a data record in the Table $T_1$. In some implementations, the data record may correspond to a row in the database table, whereas the key associated with the data record may correspond to a value occupying a column in the row. The key may be used to locate the particular data record or group of data records, and may identify a particular column or a group of columns referenced in the query. In some implementations, the key is associated with a limited number of rows and/or columns.

Still referring to FIG. 1, the query handler 202 may receive a query that requires access to data stored in the Table $T_1$, and includes a reference to at least one row and/or at least one column of the Table $T_1$. Rather than the execution engine 150 preparing all of the data table for accessing during runtime by opening all of the fragments of Table $T_1$, the query handler 202 may intercept the query and take over the table opening sequence of operations before the query plan is executed by the execution engine 150. For example, the query handler 202 may intercept the query as discussed in more detail below. Then, the query handler 202 may read each row of each fragment of Table $T_1$, beginning with Fragment 1, to locate the data record corresponding to the referenced row and/or column. As shown in FIG. 1, the query handler 202 may read row R1 of Fragment 1, row R2 of Fragment 1, then row R3 of Fragment 1, and so on, until the query handler 202 locates the data record corresponding to the referenced row and/or column. When the query handler 202 locates the data record corresponding to the referenced row and/or column, the query handler 202 may stop reading Fragment 1 (or only the referenced row and/or column) before the query is executed. Since the query handler 202 has located all of the referenced rows and/or columns, the query handler 202 does not continue to read any of the remaining fragments of the one or more fragments 206 of the Table $T_1$ (e.g., Fragments 2 . . . n), and thus, does not open the one or more additional fragments 206 of the Table $T_1$.

Figure 2:
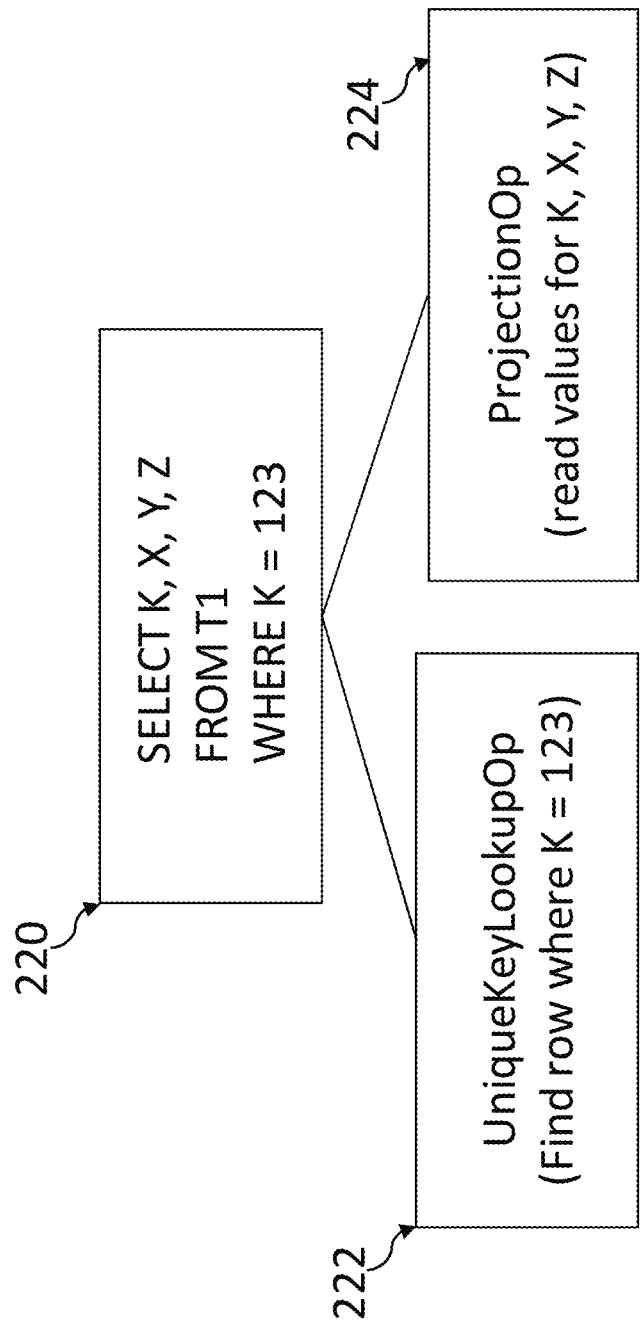
FIG. 2 depicts an example of a sequence of operations, in accordance with some example embodiments.
Figure 3:
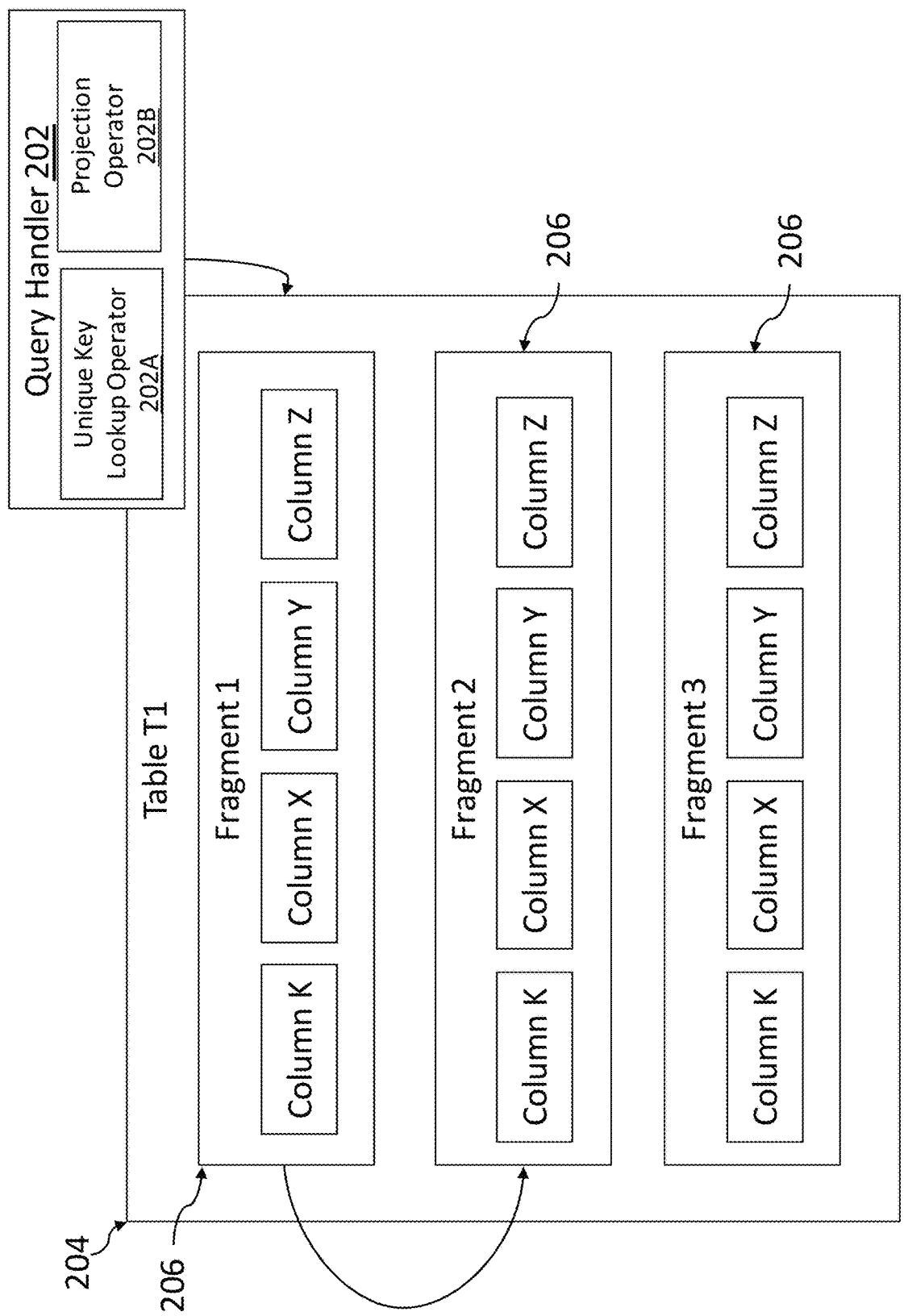
FIG. 3 depicts an example implementation of a query handler performing an operation on a data table, in accordance with some example embodiments.

FIGS. 2 and 3 illustrate an example of the query handler 202 performing a sequence of operations on a data table, in accordance with some example embodiments. As shown in FIG. 2, at 220, the database management system 100 may receive a query. In this example, the received query is to SELECT K, X, Y, Z FROM T1 WHERE K=123. This query includes a primary key lookup (e.g., an identifier or a data record in a referenced row), K=123, and includes a request to access the data stored in columns X, Y, Z where column K=123. Since the query includes the primary key lookup, which by definition refers to a limited number of rows (one row in this example), the query handler 202 intercepts the query and takes over table opening from the execution engine 150 before execution of the query.

In this example, the query handler 202 may be translated to two operators—a unique key lookup operator 202A, at 222, and a projection operator 202B, at 224. The unique key lookup operator 202A locates the row where K=123, as referenced in the query, and the projection operator executes a projection operation by reading the data records for columns K, X, Y, Z.

As shown in FIG. 3, the unique key lookup operator 202A interfaces with Table $T_1$ to locate and open the row of Table $T_1$ where K=123. For example, the unique key lookup operator 202A may read each fragment 206 of the Table $T_1$, beginning at Fragment 1. In Fragment 1, the unique key lookup operator 202A accesses Fragment 1 and reads each row of Fragment 1. In some implementations, while the unique key lookup operator 202A is accessing Fragment 1 and reading each row of Fragment 1, the query handler 202 opens at least a portion of Fragment 1. In such implementations, if the unique key lookup operator 202A does not locate the row where K=123 in Fragment 1, the query handler 202 may release (e.g., unlock or close) Fragment 1 (or the previously opened portion of Fragment 1) before or at the time that the unique key lookup operator 202A begins to access (or opens) Fragment 2 of Table $T_1$.

In the example shown in FIG. 3, the unique key lookup operator 202A has not located the row where K=123 in Fragment 2. As a result, the unique key lookup operator 202A reads Fragment 2 of Table $T_1$ to locate the row where K=123. Here, the unique key lookup operator 202A again reads each row of Fragment 2 until it locates the row where K=123. When the unique key lookup operator 202A locates the row where K=123, the unique key lookup operator 202A stops reading Fragment 2, and does not read Fragment 3, as K=123 is the only key referenced in the query. In some implementations, when the unique key lookup operator 202A locates the key, the query handler 202 opens only the data records corresponding to the columns of the row in which the key is stored. In this example, when the unique key lookup operator 202A locates the row in which K=123, the query handler 202 may open only the data records for Column K, Column X, Column Y, and Column Z in the located row. In other implementations, when the unique key lookup operator 202A locates the key, the query handler 202 opens only the fragment in which the located row is stored (e.g., in this example, the query handler 202 would only open Fragment 2). In either case, the query handler 202 opens only a subset of the fragments of Table $T_1$ (e.g., Fragment 2) or a subset of the rows and/or columns of Fragment 1 of Table $T_1$ (e.g., Columns K, X, Y, and Z where K=123).

Once the unique key lookup operator 202A locates the row, the projection operator 202B would execute the projection by at least reading the values of Columns K, X, Y, and Z in the row where K=123. Accordingly, the query handler 202 may significantly reduce the time and computational resources required to execute the query, such as when the projection operator 202B reads the values of the located row and performs the projection.

FIG. 4 depicts an example of a process 400 for taking over table opening by an operator from the execution engine, in accordance with some example embodiments, to reduce the time and computational resources required to execute the query.

At 402, a query handler may intercept a query from an execution engine that is separate from the query handler and is configured to execute the query. The query may require access to data stored in at least one data table of a database. In some implementations, the query includes an identifier (e.g., a key, and the like) that is associated with a row of the data table (or a fragment of the data table). The query may also include a reference to a limited number of columns corresponding to the row in the data table. In the example discussed above with respect to FIGS. 2 and 3, the query included a key (e.g., K=123) associated with a row and a limited number of columns corresponding to the row (e.g., Columns K, X, Y, Z). In some implementations, the identifier is associated with two or more rows in the data table (or at least one fragment of the data table) or the query includes two or more identifiers that are each associated with at least one row in the data table (or at least one fragment of the data table), and includes a reference to a limited number of columns corresponding to each of the associated rows.

In some implementations, the query handler may intercept the query and take over table opening from the database execution engine, to reduce the time and computational resources required to execute the query. For example, the query handler may determine that the query includes an identifier, or another indicator that indicates that the query requires access to a limited number of rows and/or columns in at least one of the data tables. In some implementations, the indicator indicates that the query requires access to a number of rows and/or columns in at least one of the data tables that is less than or equal to a threshold number of rows and/or columns (e.g., that is less than or equal to 1, 2, 3, 4, 5, 10, 20, or 50 or less rows and/or columns). In other implementations, the query includes an indicator that indicates that the query handler should intercept the query to take over table opening from the database execution engine before execution of a query (e.g., a query plan), or the execution engine calls the query handler to intercept to query to take over table opening from the database execution engine before execution of the query.

In some implementations, upon determining that the query handler should intercept the query to perform a sequence of operations to open the required data from the data tables referenced in the query, the query handler may translate into a lookup operator, which locates the identifier and opens the associated portion of the data table, and a query execution operator, which executes the query once the associated portion of the data table is opened. In the example discussed above with respect to FIGS. 2 and 3, the lookup operator included the unique key lookup operator 202A and the query execution operator included the projection operator 202B.

At 404, the query handler (e.g., the lookup operator) may prepare at least one table object to enable access to the data stored in the at least one data table, such as the data stored in the row and the column of the table referenced by the query. The at least one table object may include the row in which the identifier is located, and the columns referenced in the query that correspond to the row. For example, the query handler may access the at least one data table stored on the database to locate a row in at least a portion of the at least one data table (e.g., in a fragment of the at least one data table) that includes the identifier.

In some implementations, accessing the at least one data table may include opening (e.g., acquiring locks for) portions of the at least one data table while the query handler is locating the row associated with the identifier. For example, the query handler may open each row of the data table as the query handler reads the rows of the data table until the query handler locates the row associated with the identifier. As noted below, the query handler may release each row of the data table as the query handler determines that each row does not include the row associated with the identifier, after the query handler has completed reading a fragment and determined that the fragment does not include the row associated with the identifier, or after the query handler executes the query.

At 406, the query handler may locate the row associated with the identifier, and at 408, the query handler may acquire locks for the data stored in the located row and the column in the row. For example, in some implementations, the query handler acquires locks for only the data stored in the located row and the column (or columns) in the located row.

In other implementations, the query handler may open the data stored in a fragment of the table in which the row associated with the identifier is located. For example, the row associated with the identifier may be located in a first fragment of the data table. In this example, the query handler may acquire locks for all of the data stored in the first fragment of the data table.

In some implementations, the query handler may stop reading the data table (or the fragment of the data table) once the query handler locates the row associated with the identifier. In other words, the query handler may not continue to read the data table (or other portions of the data table) once the query handler locates the row associated with the identifier, as the query may not require access to the data stored in the remaining rows of the data table or fragment of the data table. Additionally or alternatively, the query handler may release data stored in any rows and/or fragments of the data table that do not include the located row associated with the identifier and that may have been opened while reading the data table. This may help to reduce the amount of time to execute the query, at least because the query handler may not read data stored in the data table that is not necessary to execution of the query.

As noted above, the data table may include one or more fragments. Thus, the query handler may read at least one row (or a plurality of rows) of a first fragment of the data table. In some implementations, the query handler may acquire locks for each row of the first fragment as the query handler accesses each row. And, as the query handler determines that each row does not include the row associated with the identifier, the query handler may release each of the read rows. In some other implementations, the query handler releases each of the read rows after completing reading of the rows of an entire fragment when the query handler determines that the rows of the fragment do not include the row associated with the identifier.

In some implementations, if the query handler determines that the first fragment does not contain the row associated with the identifier, the query handler may read at least one row (or a plurality of rows) of a second fragment of the data table, and so on. The query handler may read each of the fragments in the same manner.

At 410, the query handler (e.g., the query execution operator) may execute the query after preparing the table object. For example, the query handler may perform the operation dictated by the query using the data accessible from the opened row (or rows). In the example discussed above with respect to FIGS. 2 and 3, the projection operator 202B may perform the projection.

FIG. 5 depicts an example of a database management system 100, in accordance with some example implementations.

The database management system 100 may include one or more user equipment 102A-N, such as a computer, a smart phone, a tablet, an Internet of Things (IoT) device, and/or other computer or processor-based devices. The user equipment may include a user interface, such as a browser or other application to enable access to one or more applications, database layer(s), and/or databases, to generate queries to one or more databases 190A-N, and/or to receive responses to those queries.

In the example of FIG. 5, the databases 190A represent the database layer of a database management system where data may be persisted and/or stored in a structured way, and where the data can be queried or operated on using operations including SQL commands or other types of commands/instructions to provide reads, writes, and/or perform other operations. To illustrate by way of an example, user equipment 102A-N may send a query via an execution engine 150 to the database layer 190A-B, which may represent a persistence and/or storage layer where database tables may be stored and/or queried. The query may be sent via a connection, such as a wired and/or wireless connection (e.g., the Internet, cellular links, WiFi links, and/or the like).

The database execution engine 150 may include a query optimizer 110, such as a SQL optimizer and/or another type of optimizer, to receive at least one query from a user equipment and generate a query plan (which may be optimized) for execution by the execution engine 112. The query optimizer 110 may receive a request, such as a query, and then form or propose an optimized query plan. The query plan (which may be optimized) may be represented as a so-called "query algebra" or "relational algebra."

For example, SELECT Columns from Table A and Table B, and perform an INNER JOIN on Tables A and B may represent a query received by the database execution engine 150 including the query optimizer 110. There may be several ways of implementing execution of this query. As such, the query plan may offer hints or propose an optimum query plan with respect to the execution time of the overall query. To optimize a query, the query plan optimizer 110 may obtain one or more costs for the different ways the execution of the query plan can be performed. The costs may be obtained via the execution interface 112A from a cost function 114, which responds to the query optimizer 110 with the cost(s) for a given query plan (or portion thereof), and these costs may be in terms of execution time at the database layer 190A-N, for example.

The query optimizer 110 may form an optimum query plan, which may represent a query algebra, as noted above. To compile a query plan, the query optimizer 110 may provide the query plan to the query plan compiler 116 to enable compilation of some, if not all, of the query plan. The query plan compiler 116 may compile the optimized query algebra into operations, such as program code and/or any other type of command, operation, object, or instruction. This code may include pre-compiled code (which can be pre-compiled and stored, and then selected for certain operations in the query plan) and/or just-in-time code generated specifically for execution of the query plan. For example, plan compiler may select pre-compiled code for a given operation as part of the optimization of the query plan, while for another operation in the query plan the plan compiler may allow a compiler to generate the code. The pre-compiled and generated code represent code for executing the query plan, and this code may be provided to the plan generator 118, which interfaces the query execution engine 112.

In some implementations, the query optimizer 110 may optimize the query plan by compiling and generating code. Moreover, the query optimizer 110 may optimize the query plan to enable pipelining during execution.

In some implementations, the query optimizer 110 may be configured to select other execution engines. For example, the query optimizer 110 may select via interface 112C an execution engine configured specifically to support a row-store database or an ABAP type database, or the query optimizer 110 may select via interface 112D an execution engine configured specifically to support a column-store type database. In this way, the query optimizer 110 may select whether to use the universal database execution engine 150 or legacy (e.g., database-specific) execution engines (available via interfaces 112C/D, for example).

The query execution engine 112 may receive, from the plan generator 118, compiled code to enable execution of the optimized query plan, although the query execution engine may also receive code or other commands directly from a higher-level application or other device, such as user equipment 102A-N.

The query execution engine 112 may then forward, via an execution interface 112B, the code to a plan execution engine 120. The plan execution engine may then prepare the plan for execution, and this query plan may include pre-compiled code 125 and/or generated code 127. When the code for the query plan is ready for execution during runtime, the query execution engine 112 may step through the code performing some of the operations within the database execution engine 150 and sending some of the operations (or commands in support of an operation, such as a read, write, and/or the like) to the execution engine application programming interface (API) for execution at one or more of databases layers 190A-N.

Table 1 below depicts an example of a query execution plan including a (1) TableScan (Filter X=1) and a (2) Materialization (Columns A, B). In this example, the TableScan would result in one or more calls via the execution engine API 199 to one or more of databases 190A-B. Specifically, the TableScan operator at Table 1 would result in a call for a dictionary look up for a column "X" for the value ID of "1" and an indexvector scan with a valueid obtained from the dictionary look up, which results in a document ID list that identifies one or more rows in the table 1. Then for each document ID, a call is made via 199 to look up the value IDs for columns A and B. The value IDs may be used to look up dictionary values to materialize, the columns A and B including the actual data values for those columns.

TABLE 1

| Operator | Calls made on Database API |
|---|---|
| 1) TableScan (Filter X = 1) | dictionary lookup column "X" for the value of ID of "1" |
| | indexvector scan with a valueid from the lookup, which results in a document ID (docid) list that identifies one or more rows in table "1". |
| 2) Materialization (Columns A, B) | For each docid, lookup value IDs (valueids) for columns A + B |
| | For the valueids, lookup dictionary value in dictionaries of A and B |

In some implementations, the query execution engine 150 may, as noted, be configured to handle different types of databases and the corresponding persistent layers and/or tables therein. For example, the database 190N may be implemented as a row-oriented database, so that an insert is performed by adding a row with a corresponding row identifier, while another database 190A may be implemented as a column store database, which may use dictionaries and compressive techniques when inserting data into a table. In this example, the query execution engine 150 may perform execution related to handling the differences between these two types of databases. This may enable a reduction in processing at the database layer 190A-N. Moreover, the query execution engine 150 may perform other operations including rule-based operations, such as joins and projections, as well as filtering, group by, multidimensional analysis, and/or the like to reduce the processing burden on the database layer. In this way, the query execution engine 150 may execute these and other complex operations, while the database's persistence/storage layer 190A-N can perform simpler operations to reduce the processing burden at the database's persistence/storage layer 190A-N.

In some example embodiments, the query execution engine 150 may run, as noted above, just-in- time code 127 generated for some query operations, while pre-compiled code 125 may be run for other operations. Moreover, the query execution engine 150 may combine the generated code 127 with pre-compiled code 125 to further optimize execution of query related operations. In addition, the query execution engine 150 may provide for a plan execution framework that is able to handle data chunk(s), pipelining, and state management during query execution. Furthermore, the query execution engine 150 may provide the ability to access table storage via an abstract interface to a table adapter, which may reduce dependencies on specific types of storage/persistence layers (which may enable use with different types of storage/persistence layers).

In some example embodiments, the database execution engine 150 may be provided with at least one table adapter. In some example embodiments, the table adapter may generate an object, such as a table object, which can be stored in cache with other code, objects, and/or the like awaiting runtime execution of the query. In some example embodiments, and the table object can be opened, during query execution, to provide access to a table stored in the persistence layer of a database.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

The illustrated methods are exemplary only. Although the methods are illustrated as having a specific operational flow, two or more operations may be combined into a single operation, a single operation may be performed in two or more separate operations, one or more of the illustrated operations may not be present in various implementations, and/or additional operations which are not illustrated may be part of the methods.

What is claimed is:

1. A system comprising:
   at least one data processor; and
   at least one memory storing instructions which, when executed by the at least one data processor, result in operations comprising:
   determining, by a query handler separate from an execution engine configured to execute a query requiring access to data stored in a table and prior to the execution engine receiving the query based on entry of the query, whether to intercept the query to execute the query, the query comprising: an identifier associated with a row of the table and a reference to a column of the table, wherein the determining comprises detecting the query includes a primary key lookup, the detecting indicating that the query handler should intercept the query for execution by the query handler;
   intercepting, by the query handler and based on the determining, the query, the intercepting causing the query handler to take over, from the execution engine, table opening and execution of the query;
   preparing, by the query handler, a table object to enable access to the data stored in the row and the column of the table, the preparing forming at least a part of the table opening, the preparing comprising:
   locating, by the query handler, the row associated with the identifier; and
   acquiring locks, by the query handler, for the data stored in the located row and the column in the row; and
   executing, by the query handler, the query upon preparing the table object.

2. The system of claim 1, wherein only the data stored in the located row and the column in the row is locked by the query handler.

3. The system of claim 1, wherein the row associated with the identifier is located in a first fragment of the table.

4. The system of claim 3, wherein the preparing further comprises acquiring locks, by the query handler, for all of the data stored in the first fragment of the table.

5. The system of claim 1, wherein the locating comprises:
   reading, by the query handler, a plurality of rows of a first fragment of the table;
   acquiring locks, by the query handler, for the plurality of rows of the first fragment while reading the plurality of rows of the first fragment;

determining, by the query handler, that the plurality of rows does not include the row associated with the identifier; and releasing, by the query handler, the plurality of rows of the first fragment.

6. The system of claim 5, wherein the locating further comprises:

reading, by the query handler, a plurality of rows of a second fragment of the table;

acquiring locks, by the query handler, for the plurality of rows of the second fragment while reading the plurality of rows of the second fragment;

locating, by the query handler, the row associated with the identifier in the second fragment; and releasing, by the query handler, the locked plurality of rows of the second fragment that does not include the row associated with the identifier.

7. The system of claim 1, wherein the preparing further comprises:

reading, by the query handler, a plurality of rows of the table;

acquiring locks, by the query handler, for the plurality of rows of the table while reading the plurality of rows of the table; and releasing, by the query handler, the locked plurality of rows of the table that does not include the row associated with the identifier.

8. The system of claim 1, wherein the acquiring locks further comprises acquiring locks for a subset of fragments of the table, wherein the located row is located within the subset of fragments.

9. The system of claim 1, wherein the operations further comprise: translating, based on the determining, the query handler into a lookup operator and a query execution operator, wherein the lookup operator is configured to prepare the table object, and wherein the query execution operator is configured to execute the query.

10. The system of claim 1, wherein the query including the primary key lookup indicates the query requires access to a limited number of rows and/or columns in the table that is less than a threshold number of rows and/or columns.

11. A computer-implemented method, comprising:

determining, by a query handler separate from an execution engine configured to execute a query requiring access to data stored in a table and prior to the execution engine receiving the query based on entry of the query, whether to intercept the query, the query comprising: an identifier associated with a row of the table and a reference to a column of the table, wherein the determining comprises detecting the query includes a primary key lookup, the detecting indicating that the query handler should intercept the query for execution by the query handler;

intercepting, by the query handler and based on the determining, the query, the intercepting causing the query handler to take over, from the execution engine, table opening and execution of the query;

preparing, by the query handler, a table object to enable access to the data stored in the row and the column of the table, the preparing forming at least a part of the table opening, the preparing comprising:

locating, by the query handler, the row associated with the identifier; and acquiring locks, by the query handler, for the data stored in the located row and the column in the row; and executing, by the query handler, the query upon preparing the table object.

12. The method of claim 11, wherein only the data stored in the located row and the column in the row is locked by the query handler.

13. The method of claim 11, wherein the row associated with the identifier is located in a first fragment of the table.

14. The method of claim 13, wherein the preparing further comprises acquiring locks, by the query handler, for all of the data stored in the first fragment of the table.

15. The method of claim 11, wherein the locating comprises:

reading, by the query handler, a plurality of rows of a first fragment of the table;

acquiring locks, by the query handler, for the plurality of rows of the first fragment while reading the plurality of rows of the first fragment;

determining, by the query handler, that the plurality of rows does not include the row associated with the identifier; and releasing, by the query handler, the plurality of rows of the first fragment.

16. The method of claim 15, wherein the locating further comprises:

reading, by the query handler, a plurality of rows of a second fragment of the table;

acquiring locks, by the query handler, for the plurality of rows of the second fragment while reading the plurality of rows of the second fragment;

locating, by the query handler, the row associated with the identifier in the second fragment; and releasing, by the query handler, the locked plurality of rows of the second fragment that does not include the row associated with the identifier.

17. The method of claim 11, wherein the preparing further comprises:

reading, by the query handler, a plurality of rows of the table;

acquiring locks, by the query handler, for the plurality of rows of the table while reading the plurality of rows of the table; and releasing, by the query handler, the locked plurality of rows of the table that does not include the row associated with the identifier.

18. The method of claim 11, wherein the acquiring locks further comprises acquiring locks for a subset of fragments of the table, wherein the located row is located within the subset of fragments.

19. A non-transitory computer-readable medium storing instructions, which when executed by at least one data processor, result in operations comprising:

determining, by a query handler separate from an execution engine configured to execute a query requiring access to data stored in a table and prior to the execution engine receiving the query based on entry of the query, whether to intercept the query, the query comprising: an identifier associated with a row of the table and a reference to a column of the table, wherein the determining comprises detecting the query includes a primary key lookup, the detecting indicating that the query handler should intercept the query for execution by the query handler;

intercepting, by the query handler and based on the determining, the query, the intercepting causing the query handler to take over, from the execution engine, table opening and execution of the query;

preparing, by the query handler, a table object to enable access to the data stored in the row and the column of the table, the preparing forming at least a part of the table opening, the preparing comprising:

locating, by the query handler, the row associated with the identifier; and acquiring locks, by the query handler, for the data stored in the located row and the column in the row; and executing, by the query handler, the query upon preparing the table object.

20. The non-transitory computer-readable medium of claim 19, wherein only the data stored in the located row and the column in the row is locked by the query handler.

* * * * *